(No Model.) 2 Sheets—Sheet 2.
J. O. BROWN.
COVER FOR KNIVES OF MOWING MACHINES OR HARVESTERS.
No. 369,096. Patented Aug. 30, 1887.
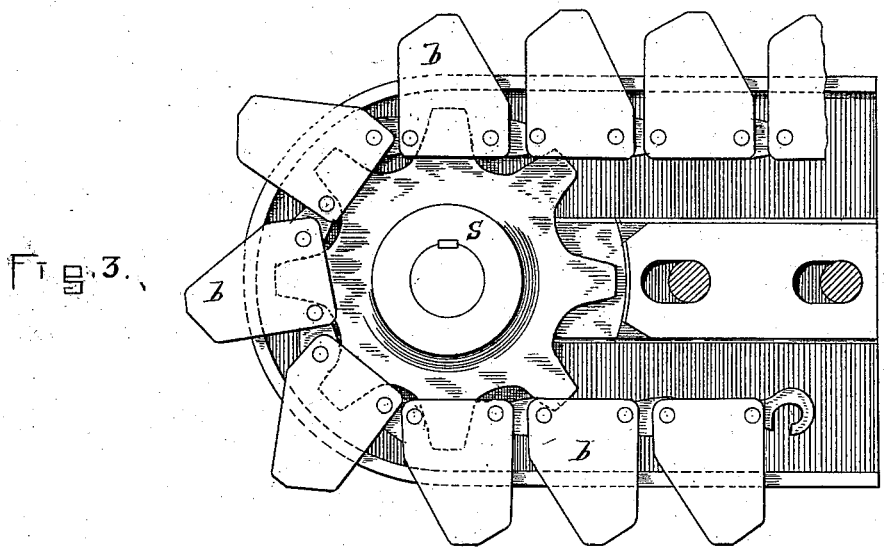
WITNESSES:
H. Brown.
A. D. Harrison
INVENTOR:
James O. Brown
by Wright Brown & Crosley
Attys.

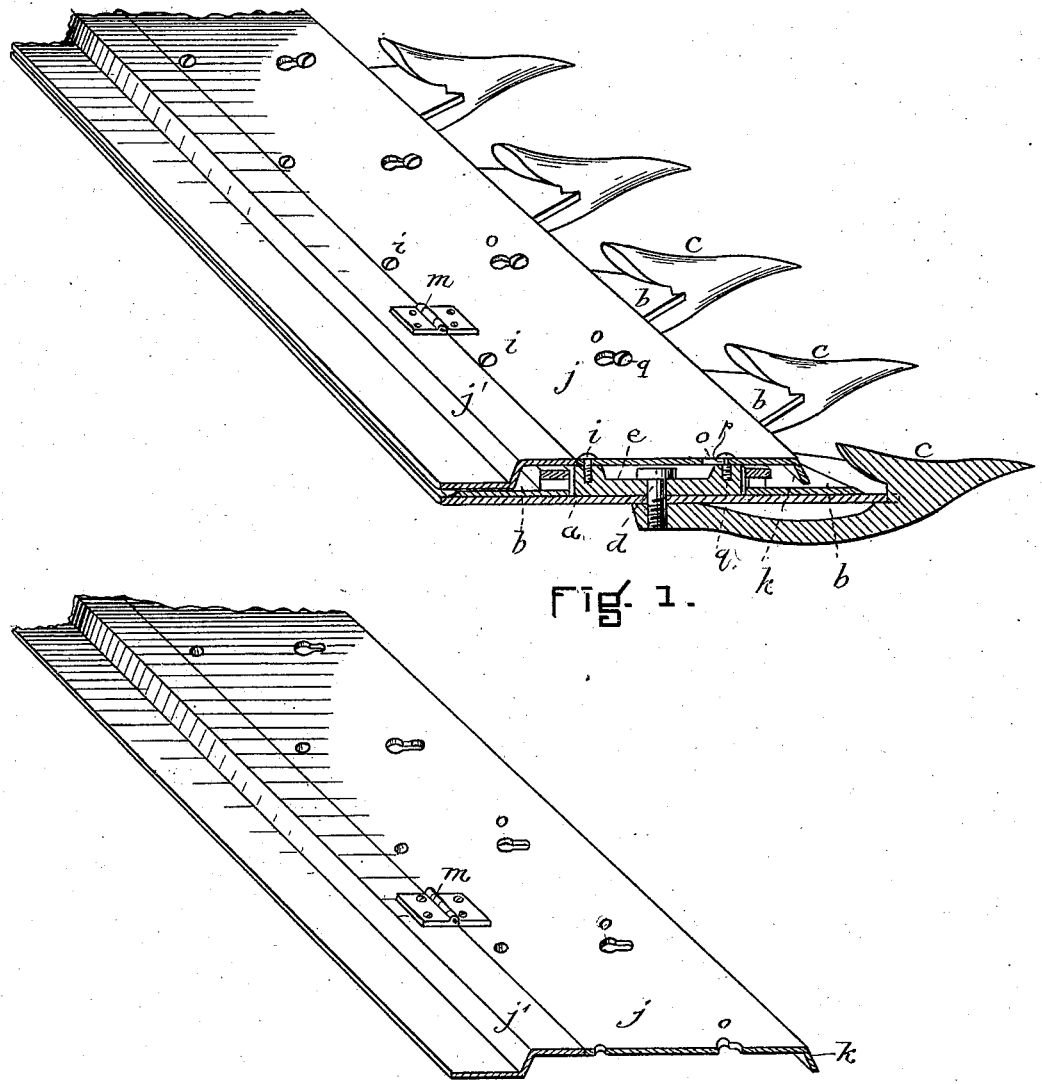

UNITED STATES PATENT OFFICE.

JAMES O. BROWN, OF BOSTON, MASSACHUSETTS, ASSIGNOR TO THE BROWN ENDLESS CUTTER COMPANY, OF SAME PLACE.

COVER FOR KNIVES OF MOWING-MACHINES OR HARVESTERS.

SPECIFICATION forming part of Letters Patent No. 369,096, dated August 30, 1887.

Application filed March 20, 1886. Serial No. 195,947. (No model.)

*To all whom it may concern:*

Be it known that I, JAMES O. BROWN, of Boston, in the county of Suffolk and State of Massachusetts, have invented certain new and useful Improvements in Covers for Knives of Mowing-Machines or Harvesters, of which the following is a specification.

This invention relates to that class of mowing-machines or harvesters in which the knives are arranged on an endless chain and move progressively instead of reciprocating.

The present invention consists in an improved cover applied to the finger-bar on which the endless chain and the knives thereon are supported, said cover being adapted to exclude dirt and other foreign matter from the knives, and to be raised to remove such matter as may accumulate between it and the knives, as I will now proceed to describe.

Of the accompanying drawings, forming a part of this specification, Figure 1 represents a perspective view and transverse section of a portion of a finger-bar having progressively-moving knives and a cover therefor constructed in accordance with my invention. Fig. 2 is a perspective view of a portion of the cover detached. Fig. 3 represents a top view of a portion of the finger-bar, showing part of the knives and one of the wheels which impel the knives.

The same letters of reference indicate the same parts in all the figures.

In the drawings, $a$ represents the finger-bar, which supports the knives or cutters $b\ b$ and the guard-fingers $c\ c$, through openings in which the knives pass, the knives being connected in an endless chain or series and moved progressively by means of sprocket-wheels S, Fig. 3, supported by said bar, one of said wheels being positively rotated by the motion of the machine, as shown, for example, in Letters Patent No. 211,377, granted to me January 14, 1879. The guard-fingers are attached by bolts $d$ to the finger-bar, their rear portions bearing against the under side of said bar. On the upper side of the finger-bar is a bar or rib, $e$, affixed preferably by the bolts $d$ and serving as a guide for the knives $b$, said knives moving in one direction along one edge of the rib $e$, and in the opposite direction along the opposite edge thereof. The finger-bar has a series of teeth formed on its forward edge, which teeth project into the slots in the guard-fingers and form fixed cutters co-operating with the moving knives.

In carrying out my invention I secure to the bar or rib $e$ by means of screws $i$ a cover, preferably of sheet metal, composed of two sections, $j$ and $j'$. The section $j$ receives the screws $i$ and extends forward across the rib $e$, and has a flange, $k$, at its forward edge, which extends across the knives $b$, that are co-operating with the guard-fingers, the finger-bar and flange entirely covering the inner portions or bases of said knives, so that grass, &c., cannot enter the crevices between the adjacent edges of the knives nor become entangled with the links that connect the knives in an endless series or chain. The section $j'$ of the cover is connected to the fixed section $j$ by hinges $m$, and extends backwardly, so that it entirely covers the knives back of the rib or bar $e$ said section being offset, so that its rear portion is close to the upper surfaces of said knives, as shown in Fig. 1. The hinges $m$ enable the section $j'$ to be raised to obtain access to the knives or to remove any matter that may have accumulated between the knives and cover. I make provision for raising the forward edge of the section $j$ of the cover for the same purpose by engaging slots $o$ in said section with grooves $p$ in screws $q$ inserted in the forward portion of the rib. Said slots are keyhole-shaped, their larger ends being formed to slip over the heads of the screws $q$, while their narrower portions are of suitable width to engage with said grooves in the screws $q$. By turning the screws $q$ so as to raise or lower them in the rib $e$, I correspondingly raise or lower the forward edge of the section $j$, the flexibility of said section permitting this to be done without loosening the screws $i$.

The object of the provision of means for raising or lowering the section $j$ is to enable said section to be pressed downwardly and hold the knives against the toothed bar when the nature of the grass is such as to tend to lift the knives from said bar and thus prevent their efficient cutting action. When this tendency does not exist, the edge of the section $j$ may be raised so as not to bear on the knives, thus avoiding unnecessary friction.

It will be seen that the cover thus constructed is simple and constitutes an efficient protection to the knives.

If desired, the cover may be made in a single piece instead of in two sections.

I claim—

1. The combination of the finger-bar having the central rib, the knives movable around said rib upon the upper surface of the finger-bar, the cover supported by said rib and projecting over the knives at the front side of the rib, and devices, substantially as described, for vertically adjusting the forward edge of said cover and holding it in any position to which it may be adjusted, whereby the cover may be held in contact with the knives to keep the same in contact with the finger-bar, or raised and held away from the knives to obviate friction thereon, as set forth.

2. The combination of the finger-bar having the central rib, the knives movable around said rib, and the cover having the section $j$ attached to the rib rigidly at its rear edge and vertically movable at its forward edge, as set forth.

3. The combination of the finger-bar having the central rib, the knives movable around said rib, and the cover composed of the section $j$, attached to the rib, and the section $j'$, hinged to the section $j$, as set forth.

In testimony whereof I have signed my name to this specification, in the presence of two subscribing witnesses, this 13th day of March, 1886.

JAMES O. BROWN.

Witnesses:
C. F. BROWN,
N. H. BROWN.